(12) United States Patent
McKeigue et al.

(10) Patent No.: US 6,475,349 B1
(45) Date of Patent: Nov. 5, 2002

(54) DISTILLATION COLUMN AND METHOD FOR PROMOTING A UNIFORM VAPOR FLOW

(75) Inventors: Kevin McKeigue, Berkeley Heights; Nancy Christine Irwin, Summit, both of NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 09/405,327

(22) Filed: Sep. 24, 1999

(51) Int. Cl.⁷ .............................. B01D 3/14; B01F 3/04
(52) U.S. Cl. ...................... 203/100; 159/43.1; 202/158; 261/96; 261/97; 261/113
(58) Field of Search ................................. 202/158, 239; 159/43.1; 261/97, 98, 94, 96, 113, DIG. 72; 203/100; 62/24, 32, 36; 422/195

(56) References Cited

U.S. PATENT DOCUMENTS

| | | | | |
|---|---|---|---|---|
| 4,810,428 A | * | 3/1989 | Aly et al. ..................... 261/96 |
| 4,820,455 A | * | 4/1989 | Kunesh et al. ................. 261/97 |
| 5,100,448 A | | 3/1992 | Lockett et al. ................. 62/24 |
| 5,419,136 A | | 5/1995 | McKeigue ..................... 62/24 |
| 5,776,316 A | * | 7/1998 | Potthoff et al. ............. 202/158 |
| 6,059,272 A | * | 5/2000 | Potthoff et al. ............... 261/97 |
| 6,086,055 A | * | 7/2000 | Armstrong et al. ........... 261/97 |
| 6,128,922 A | | 10/2000 | Dean et al. .................... 62/643 |

* cited by examiner

Primary Examiner—Virginia Manoharan
(74) Attorney, Agent, or Firm—Wan Yee Cheung; Salvatore P. Pace

(57) ABSTRACT

A distillation column and method in which a plurality of beds of structured packing are provided within a column shell and are configured to contact liquid and vapor phases of the mixture to be distilled. At least one liquid redistributor is located between the beds of structured packing to redistribute the liquid of the liquid phase and an annular collector is located above the liquid distributor to direct liquid to the liquid distributor. The annular collector acs as a constriction to produce a central flow of the vapor phase which can result in decreased performance of overlying beds of structured packing. In order to overcome this potential problem, a truncated bed of structured packing is provided directly above the annular collector to promote a more uniform distribution of such central vapor flow in a transverse direction of the column shell. The truncated bed of structured packing is fabricated from layers of structured packing each having a height less than that of packing layers of overlying beds of structured packing.

7 Claims, 1 Drawing Sheet

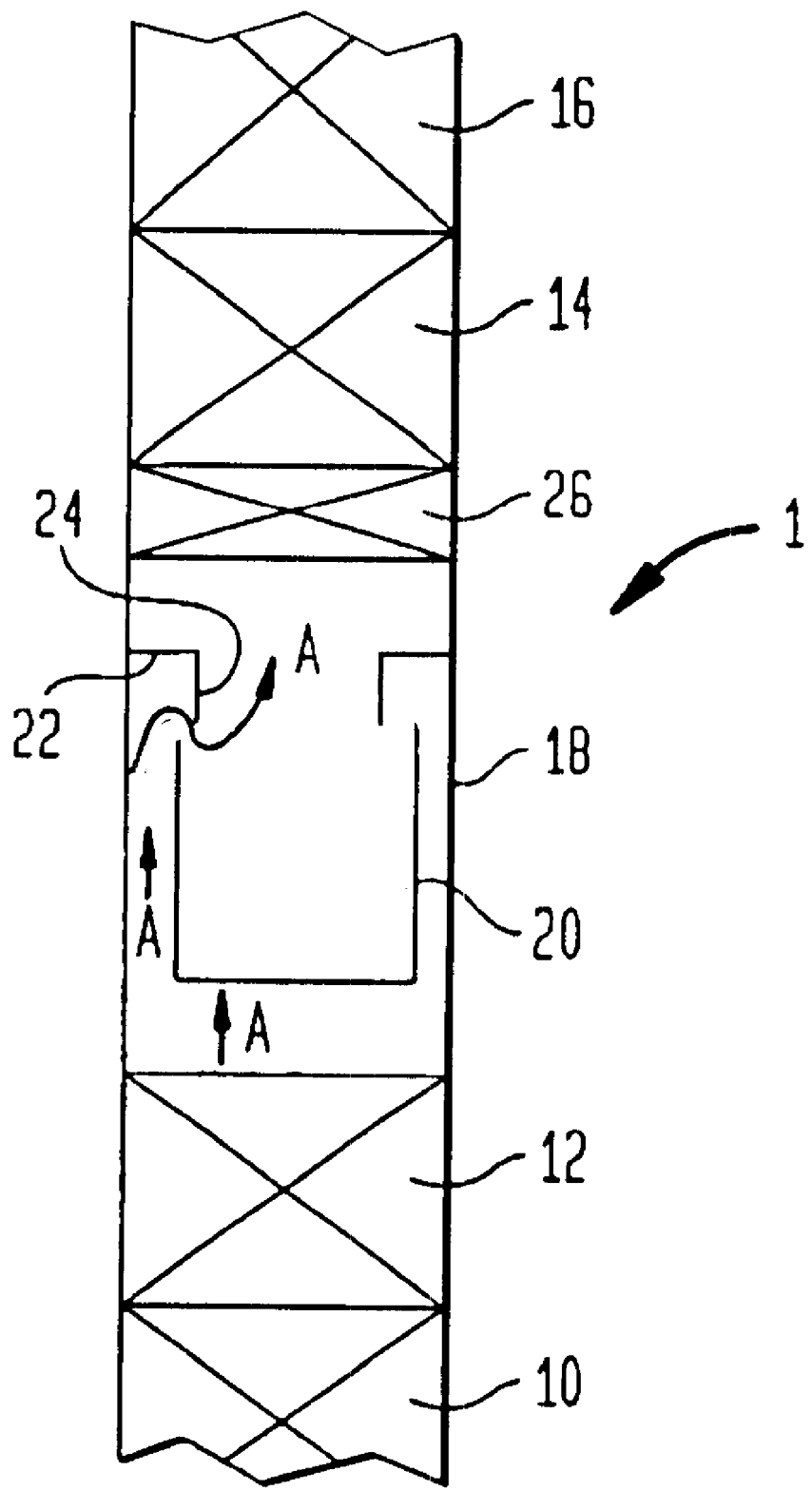

DISTILLATION COLUMN AND METHOD FOR PROMOTING A UNIFORM VAPOR FLOW

BACKGROUND OF THE INVENTION

The present invention relates to a distillation column and method for promoting a uniform vapor flow through the distillation column. More particularly, the present invention relates to such a distillation column and method in which the distillation column employs an annular collector and a liquid redistributor to redistribute liquid between beds of structured packing. Even more particularly, the present invention relates to such a distillation column and method in which a truncated bed of structured packing is employed above the annular collector to promote a more uniform distribution of vapor flow.

Mixtures are separated within distillation columns by contacting an ascending vapor phase of the mixture with a descending liquid phase of the mixture. The ascending vapor phase of the mixture becomes ever more enriched in higher volatility mixture components as it ascends and the descending liquid phase becomes ever more enriched with the lower volatility mixture components as it descends. In order for the distillation to occur, the vapor and liquid phases of the mixture must be brought into intimate contact by mass transfer elements which can be in the form of structured packing. Structured packing consists of corrugated sheets of material that are vertically oriented and arranged such that the corrugations crisscross one another. The vapor phase rises through the corrugations and the liquid phase descends as a film along the surface of the packing.

The height of a particular packing that is necessary to effectuate a particular distillation is determined by experimental and/or other types of theoretical data. Such predictive performance data for a particular packing used for separating a particular mixture is referred to as height equivalent to a theoretical plate which is abbreviated as HETP. In order to reliably use such data to design a column, the liquid at any level of the column must have a fairly constant composition across the column and the vapor must have a uniform flow across the column and therefore, the packing to contact the descending liquid. If this does not occur, then the packing operates with less efficiency and therefore a higher HETP.

In order to ensure a constant composition of liquid across the column, liquid redistributors are placed between packing beds. There are many designs for such liquid redistributors. Some of such liquid redistributors employ an annular collector to funnel liquid to the redistributor. An example of such a liquid redistributor is in the form of an open-ended container, perforated at the bottom for liquid to drip onto the underlying packing. The annular collector is in the form of an annulus with a central open area. Another example is a chevron-type collector that is employed to direct liquid to a channel distributor., Such annular collectors can become particularly troublesome because they act as a constriction to produce an accelerated, central flow of vapor that is not evenly distributed across the column. This produces a loss in the predicted performance of the packing overlying the annular collector.

As will be discussed, the present invention provides a distillation column and a method ensuring uniform vapor flow across the distillation column when annular collectors are used throughout the packing within the column to perform as predicted.

SUMMARY OF THE INVENTION

The present invention provides a distillation column that has a plurality of beds of structured packing located within a column shell. The structured packing is configured to contact liquid and vapor phases of a mixture to be distilled within the distillation column. At least one liquid redistributor is located between the beds of structured packing to redistribute liquid of the liquid phase from an overlying bed of structured packing to an underlying bed of structured packing. An annular collector is located above the at least one liquid redistributor to direct said liquid to said at least one liquid distributor. The annular collector acts as a constriction to produce a central vapor flow of said vapor phase. This central flow of vapor would tend to lessen the efficiency of the packing because the vapor would not be evenly distributed across the packing. In order to overcome this, the present invention provides a truncated bed of structured packing included in the plurality of beds of structured packing that is located directly above the annular collector to promote a more uniform distribution of the central vapor flow in a transverse direction of the column shell. The truncated bed of structured packing is fabricated from layers of packing each having a height less than that of packing layers of an overlying bed of structured packing.

As may be appreciated, the truncated bed of structured packing will increase column height and therefore cost. Therefore, the height of the layers of packing that form the truncated bed are preferably half as high as those of the overlying bed of structured packing. As may be appreciated, the constriction of the liquid distributor produces a reduction in the cross-sectional flow area of the column. As a result, the vapor velocity increases. This can produce premature flooding in the truncated bed of structured packing. Therefore, the truncated bed of structured packing is selected to have a packing density less than that of the overlying bed of structured packing.

In another aspect, the present invention provides a method of promoting a uniform vapor flow through at distillation column having beds of structured packing, at least one liquid redistributor located between the beds of structured packing, and an annular collector is located above the at least one liquid redistributor to direct said liquid to said at least one liquid distributor. The annular collector acts as a constriction to produce a central vapor flow of said vapor phase. In accordance with the method, the central vapor flow from the annular collector is introduced into a truncated bed of structured packing, included in the plurality of the beds of structured packing and fabricated from layers of packing each having a height less than that of packing layers of an overlying bed of structured packing.

It should be pointed out that the present invention applies to a bed of structured packing of any type. The term, "structured packing" as used herein and in the claims means a packing that consists of multiple sheets of corrugated material in which the corrugations crisscross one another and the sheets are arranged in a vertical orientation within the column. The term, "bed" as used herein and in the claims means an arrangement of structured packing in multiple layers in which the sheets of structured packing of one layer are orientated at right angles to the sheets of structured packing of an adjacent layer. Each "layer", as used herein and in the claims is fabricated by plurality of side-by-side sheets of corrugated material.

BRIEF DESCRIPTION OF THE DRAWINGS

While the specification concludes with claims distinctly pointing out the subject matter that applicants regard as their invention, it is believed that the invention will be better understood when taken in connection with the accompanying drawings in which the sole FIGURE is a schematic representation of a distillation column and method in accordance with the present invention.

DETAILED DESCRIPTION

With reference to the FIGURE, a distillation column 1 in accordance with the present invention is illustrated. Distillation column 1 has a plurality of beds 10, 12, 14, 16 (and 26 that will be discussed in more detail hereinafter) located within a column shell 18. The number of beds of structured packing shown are exemplary only. Furthermore, the present invention is not limited to any specific distillation and has a more general applicability.

Distillation column 1 incorporates a liquid redistributor 20 located between beds of structured packing 12 and 14 to redistribute liquid from the liquid phase descending in column 1. It is understood that although only one liquid redistributor is shown, a distillation column in accordance with the present invention might incorporate multiple liquid redistributors. Liquid redistributor 20 is in the form of an open ended container that is perforated on the bottom to allow liquid to be distributed across the top of bed of structured packing 12.

An annular collector 22, also known, is also located above liquid redistributor 20 and has an inner open area 24 to direct liquid to liquid redistributor 20. The annular collector 22 in plan view, would have a circular configuration with inner open area 24 being circular. The vapor indicated by arrowheads A flows around liquid redistributor 20 and up through inner open area 24 produce a central vapor flow of the vapor phase to be distilled. In the type of annular collector illustrated by annular collector 22, it is inner open area 24 that acts as the constriction to the vapor flow.

In order to promote a more uniform flow into overlying bed of structured packing 14, a truncated bed of structured packing 26 is provided. This truncated bed of structured packing 26 is so named because it is fabricated from layers, each having a height less than that of packing layers making up the overlying bed of structured packing 14. Preferably such layers are half as high as the packing layers of the bed of structured packing 14. Put another way, truncated bed of structured packing 26 is formed from corrugated sheets half as high as those used in overlying bed of structured packing 14. Moreover, the packing density of structured packing 26 is also less than the bed of structured packing 14. For instance, if structured packing 14 had a density of 500 $m^2/m^3$, the bed of structured packing 26 might be given a packing density of 350 $m^2/m^3$.

As will be understood to those skilled in the art, although the present invention has been described with reference to a preferred embodiment, numerous changes, additions and omissions may be made without departing from the spirit and scope of the present invention.

We claim:

1. A distillation column comprising:
   a plurality of beds of structured packing located within a column shell and configured to contact liquid and vapor phases of a mixture to be distilled;
   at least one liquid redistributor located between said beds of structured packing to redistribute liquid of the liquid phase; and
   an annular collector located above the at least one liquid redistributor to direct said liquid to said at least one liquid redistributor, the annular collector having an inner open area that acts as a constriction to produce a central vapor flow of said vapor phase; and
   the plurality of beds of structured packing including a truncated bed of structured packing located directly above said annular collector to promote a more uniform distribution of said central vapor flow in a transverse direction of said column shell and fabricated from layers of packing each having a height less than that of packing layers of an overlying bed of structured packing.

2. The distillation column of claim 1, wherein said truncated bed of structured packing has a packing density less than that of said overlying bed of structured packing.

3. The distillation column of claim 1, wherein said layers of packing are half as high as said packing layers of said overlying bed of structured packing.

4. The distillation column of claim 1, wherein said liquid redistributor is an open-ended container having a perforated bottom.

5. A distillation column comprising:
   a plurality of beds of structured packing located within a column shell and configured to contact liquid and vapor phases of a mixture to be distilled;
   at least one liquid distributor located between said beds of structured packing to redistribute liquid of the liquid phase;
   an annular collector located above the at least one liquid redistributor to direct said liquid to said at least one liquid redistributor, the annular collector having an inner open area that acts as a constriction to produce a central vapor flow of said vapor phase, and
   the plurality of beds of structured packing including a truncated bed of structured packing located directly above said annular collector to promote a more uniform distribution of said central vapor flow in a transverse direction of said column shell and fabricated from layers of packing each having half as high as those within packing layers of an overlying bed of structured packing.

6. A method of distillation comprising using a distillation column having beds of structured packing, at least one liquid redistributor located between beds of structured packing and an annular collector located above the at least one liquid redistributor to direct said liquid to said at least one liquid redistributor, the annular collector having an inner open area that acts as a constriction to produce a central vapor flow of a vapor phase, providing a truncated bed of structured packing directly above said annular collector to promote a more uniform vapor flow through said distillation column, and introducing said vapor flow from said annular collector into said truncated bed of structured packing included in the beds of structured packing fabricated from layers of packing each having a height less than that of packing layers of an overlying bed of structured packing.

7. The method of claim 6, wherein said truncated bed of structured packing has a packing density lower than that of said overlying bed of structured packing.

* * * * *